United States Patent Office 3,687,825
Patented Aug. 29, 1972

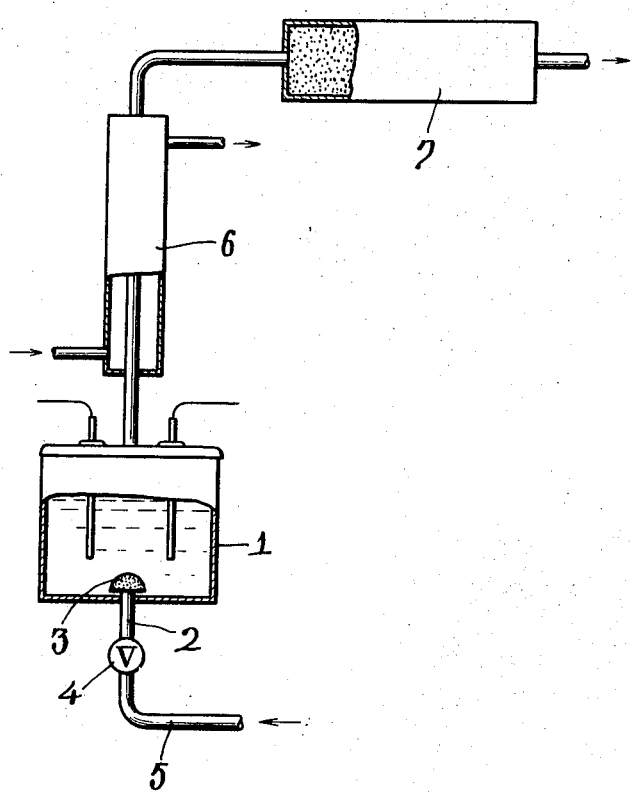

3,687,825
PROCESS FOR THE PRODUCTION OF TRIFLUOROMETHYL HYPOFLUORITE
Shuniji Nagase, Takashi Abe, Hajime Baba, and Kazuo Kodaira, Nagoya, Japan, assignors to Agency of Industrial Science & Technology, Tokyo, Japan
Filed Mar. 13, 1970, Ser. No. 19,434
Claims priority, application Japan, Mar. 17, 1969, 44/20,265
Int. Cl. B01k 13/00
U.S. Cl. 204—59 R          1 Claim

ABSTRACT OF THE DISCLOSURE

Trifluoromethyl hypofluorite is produced by blowing carbonyl fluoride in a bubble state into anhydrous hydrogen fluoride through which electric current is being passed, thereby fluorinating said carbonyl fluoride.

BACKGROUND OF THE INVENTION

This invention relates to a process for the production of trifluoromethyl hypofluorite ($CF_3OF$). It is well known that trifluoromethyl hypofluorite is a useful fluorinating agent for organic compounds because of its ability to replace the hydrogen atoms of organic compounds directly and selectively with fluorine atoms. Heretofore, trifluoromethyl hypofluorite has been produced by fluorination of carbon monoxide, carbonyl fluoride, alcohol, etc., but this method is complicated and, in addition, has a disadvantage in that it requires the direct use of fluorine gas as a fluorinating agent and such gas is expensive and difficult to handle.

The primary object of this invention is therefore to provide a process for the production of trifluoromethyl hypofluorite easily and continuously by employing anhydrous hydrogen fluoride as the fluorine source in place of the expensive fluorine gas used in the conventional method.

The further objects and other features of this invention will be understood from the following detailed explanation with reference to the attached drawing.

BRIEF EXPLANATION OF THE DRAWING

The drawing is a systematic view, partially cut, showing an embodiment of the apparatus for carrying out the process of this invention.

DETAILED EXPLANATION OF THE INVENTION

This invention relates to a process for the continuous production of trifluoromethyl hypofluorite which comprises fluorinating carbonyl fluoride by electrolytic fluorination reaction using anhydrous hydrogen fluoride as the fluorine source.

Referring to the drawing, the inside of electrolytic cell 1 made of iron or Monel metal is provided with nickel plate electrodes. At the bottom of the cell 1, there is also provided a pipe 2 made of polyethylene, fluorinated resin, nickel, etc., the upper open end of which forms a bubbler and is capped with a porous material 3 such as filter paper made of, for example, polytetrafluoroethylene fiber which can withstand the corrosiveness of the anhydrous hydrofluoric acid, the other end of said pipe 2 being connected to a carbonyl fluoride feeding pipe 5 through a valve 4.

A reflux condenser 6 made of copper is mounted on the top of the electrolytic cell 1. The vapourized anhydrous hydrogen fluoride is condensed in said reflux condenser and returned to the electrolytic cell 1. The other end of the condenser 6 is connected to a pipe 7 filled with sodium fluoride for absorbing the anhydrous hydrogen fluoride which has passed through the condenser.

In carrying out the process of this invention, the electrolytic cell is first charged with anhydrous hydrogen fluoride and pre-electrolyzed to remove the impurities contained in the anhydrous hydrogen fluoride. Thereafter, an additive which induces conductivity, for example, sodium fluoride, is added to the anhydrous hydrogen fluoride.

Electrolysis is then performed at a voltage in the range of 5–7 v. and at an anodic current density in the range of 1.5–3.5 a./dm.² while blowing carbonyl fluoride in a fine bubble state into the anhydrous hydrogen fluoride in the cell through the bubbler at the bottom of the cell. As the carbonyl fluoride passes upwardly through the anhydrous hydrogen fluoride, the former is fluorinated to trifluoromethyl hypofluorite. The gas generated in the electrolytic cell is passed into the reflux condenser made of copper where the anhydrous hydrogen fluoride contained in the gas is condensed and returned to the cell. A small amount of anhydrous hydrogen fluoride which has passed through the condenser is absorbed and removed by the sodium fluoride pipe.

The bath temperature of the electrolytic cell during the electrolytic fluorination can be below 19.5° C. which is the boiling point of the anhydrous hydrogen fluoride and, preferably, is maintained at from 7 to 8° C.

The raw material gas may be carbonyl fluoride alone, but, in order to carry out the fluorination reaction more smoothly, it is preferable to use carbonyl fluoride mixed with an inert gas such as helium or the like.

The process of this invention may also be adopted to such compounds as carbon monoxide and phosgene which can be converted to carbonyl fluoride by electrolytic fluorination. Thus, when the compound is fluorinated in such a manner that it is brought into contact with anhydrous hydrogen fluoride for a prolonged period of time, the compound is first converted to carbonyl fluoride which is then fluorinated to the desired trifluoromethyl hypofluorite.

The product thus obtained can be analyzed by means of gas chromatography, infrared absorption spectrum, or the like.

The present invention is further illustrated by the following examples but is not limited thereto.

Example 1

An electrolytic fluorination reaction was carried out under the conditions of anodic current density of 2.2 a./dm.², cell voltage of 5.5–6 v. and a bath temperature of about 7° C. while blowing carbonyl fluoride at a rate of 49 ml./min. and helium at a rate of 20 ml./min. into 1 l. of anhydrous hydrogen fluoride (containing 10 g. of sodium fluoride) from which impurities had been removed by pre-electrolysis. The total amount of the carbonyl fluoride supplied was 0.197 mole. The gas which was generated out of the electrolytic cell was passed into a sodium fluoride pipe where the anhydrous fluoride was removed. By gas chromatography, infrared absorption spectrum, etc., it was confirmed that the reacted gas generated by the electrolytic cell consisted mainly of trifluoromethyl hypofluorite and also contained other products such as bistrifluoromethyl peroxide, tetrafluoromethane, a small amount of oxygen difluoride, unreacted carbonyl fluoride, etc.

The gas chromatography referred to above was carried out by using helium carrier gas, 60–80 mesh Celite as a column packing and FC–43 (66%) as a liquid phase.

The composition (mole percent) of the resulting product from the above reaction was as follows:

| | Percent |
|---|---|
| $CF_3OF$ | 73 |
| $CF_3OOCF_3$ | 17 |
| $CF_4$ | 10 |

The total yield was 74%.

Example 2

The procedure described in Example 1 was followed under substantially the same electrolytic conditions but using carbonyl fluoride fed at a rate of 38 ml./min. The total amount of the carbonyl fluoride fed was 0.263 mole. The composition (mole percent) of the resulting reaction product was as follows:

| | Percent |
|---|---|
| $CF_3OF$ | 69 |
| $CF_3OOCF_3$ | 16 |
| $CF_4$ | 15 |

The total yield was 82%.

What is claimed is:

1. A process for the production of trifluoromethyl hypofluorite which comprises blowing fine bubbles of carbonyl fluoride into anhydrous hydrogen fluoride through which electric current is passing, electrolytically fluorinating the carbonyl fluoride in said anhydrous hydrogen fluoride, and recovering trifluoromethyl hypofluorite.

References Cited

UNITED STATES PATENTS 3,461,050   8/1969   Childs _____ 204—59

HOWARD S. WILLIAMS, Primary Examiner